United States Patent [19]
Kohno et al.

[11] Patent Number: 5,385,018
[45] Date of Patent: Jan. 31, 1995

[54] DEVICE FOR TRANSMITTING AUTOMOTIVE ENGINE DRIVING TORQUE FOR AUTOMATIC POWER TRANSMISSION WITH FEATURE OF ABSORPTION OF TORSIONAL VIBRATION

[75] Inventors: Satoshi Kohno; Tatsuya Morishita; Shouichi Tsuchiya, all of Kanagawa, Japan

[73] Assignee: Unisia Jecs Corporation, Japan

[21] Appl. No.: 52,299

[22] Filed: Apr. 26, 1993

Related U.S. Application Data

[63] Continuation-in-part of Ser. No. 658,701, Feb. 21, 1991, abandoned.

[30] Foreign Application Priority Data

Feb. 28, 1990 [JP] Japan .................. 2-47741
Jan. 17, 1991 [JP] Japan .................. 3-003552

[51] Int. Cl.⁶ .......................................... F16D 33/00
[52] U.S. Cl. ................................................ 60/338
[58] Field of Search .............. 60/330, 338; 188/276; 267/64.11

[56] References Cited

U.S. PATENT DOCUMENTS

| | | | |
|---|---|---|---|
| 2,371,705 | 3/1945 | O'Connor | 188/276 |
| 3,837,182 | 9/1974 | Kulhavy . | |
| 4,148,200 | 4/1990 | Schallhorn et al. . | |
| 4,535,977 | 8/1985 | Strong | 188/276 |
| 4,674,991 | 6/1987 | Tojima . | |
| 4,928,486 | 5/1990 | Despres | 60/338 |

FOREIGN PATENT DOCUMENTS

| | | |
|---|---|---|
| 0154088 | 9/1985 | European Pat. Off. . |
| 58-79156 | 5/1983 | Japan . |
| 1199175 | 7/1970 | United Kingdom . |
| 2122725 | 1/1984 | United Kingdom . |

*Primary Examiner*—Edward K. Look
*Assistant Examiner*—F. Daniel Lopez
*Attorney, Agent, or Firm*—Ronald P. Kananen

[57] ABSTRACT

A torque transmission device for an automatic power transmission employs a viscous coupling interposed between a crankshaft and a converter cover of a torque converter. The viscous coupling is effective for damping torsional vibration input from the camshaft by viscosity thereof.

6 Claims, 5 Drawing Sheets

DEVICE FOR TRANSMITTING AUTOMOTIVE ENGINE DRIVING TORQUE FOR AUTOMATIC POWER TRANSMISSION WITH FEATURE OF ABSORPTION OF TORSIONAL VIBRATION

This application is a continuation-in-part of application Ser. No. 07/658,701 filed Feb. 21, 1991, now abandoned.

BACKGROUND OF THE INVENTION

1. Field of the Invention

The present invention relates to a torque transmission device for an automatic power transmission for an automotive vehicle. More specifically, the invention relates to a torque transmission device which is capable of absorption of torsional vibration induced by an engine output fluctuation.

2. Description of the Background Art

In the recent years, there has been developed and proposed a torque transmission system between an automotive internal combustion engine and a torque converter of an automatic power transmission, which can absorb shock induced by an engine output fluctuation. Such torque transmission device employs a torsion damper interposed between a crankshaft as the output element of the internal combustion engine and a converter cover which serves as an input element of the torque converter. One example of such type of the torque transmission device has been disclosed in the Japanese Utility Model First (unexamined) Publication 58-79156.

Such prior proposed torque transmission devices are not at all satisfactory in damping torsional vibration induced on the crankshaft. Especially, the torsional vibration on the crankshaft influences vehicular body vibration and vehicular cabin noise when the automatic power transmission operates in a lock-up mode, in which the crankshaft is directly and mechanically coupled with an input shaft of the power transmission. Transmission of torsional vibration from the crankshaft to the power transmission may cause an uncomfortable vehicular body vibration and noise to degrade vehicular riding comfort.

SUMMARY OF THE INVENTION

Therefore, it is an object of the present invention to provide a torque transmission device for an automatic power transmission, which can suppress torsional vibration to be transmitted from a crankshaft to a converter cover.

According to the present invention, a torque transmission arrangement is provided with:
an engine having an engine output shaft rotatable about an axis;
a torque converter coaxially arranged with said engine output shaft and rotatable about said axis, said torque converter including a converter cover adjacent said engine output shaft;
a drive plate connected to said torque converter for unitary rotation therewith;
hydraulic fluid means operatively disposed between said engine output shaft and said drive plate for hydraulically opposing relative angular displacement between said engine output shaft and said drive plate thereby to transmit torque therebetween,
said hydraulic fluid means including a hydraulic damper having a radially inner end portion connected to said engine output shaft and a radially outer end portion connected to said drive plate, said hydraulic damper extending radially, with respect to said axis, from said engine output shaft to said drive plate.

According to another aspect of the present invention, a torque transmission arrangement is provided with:
an engine having an engine output shaft rotatable about an axis;
a torque converter coaxially arranged with said engine output shaft and rotatable about said axis, said torque converter including a converter cover adjacent said engine output shaft;
a drive plate connected to said torque converter for unitary rotation therewith;
hydraulic fluid means operatively disposed between said engine output shaft and said drive plate for hydraulically opposing relative angular displacement between said engine output shaft and said drive plate thereby to transmit torque therebetween,
said hydraulic fluid means including a plurality of hydraulic dampers, each having a radially inner end portion and a radially outer end portion, means whereby each of said radially inner end portions of said plurality of dampers is rotatably supported by said engine output shaft, and means whereby each of said radially outer end portions is rotatably supported by said drive plate, said plurality of hydraulic dampers extending radially, with respect to said axis, from said engine output shaft to said driver plate.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings.

DESCRIPTION OF THE PREFERRED EMBODIMENT

Figure 1:
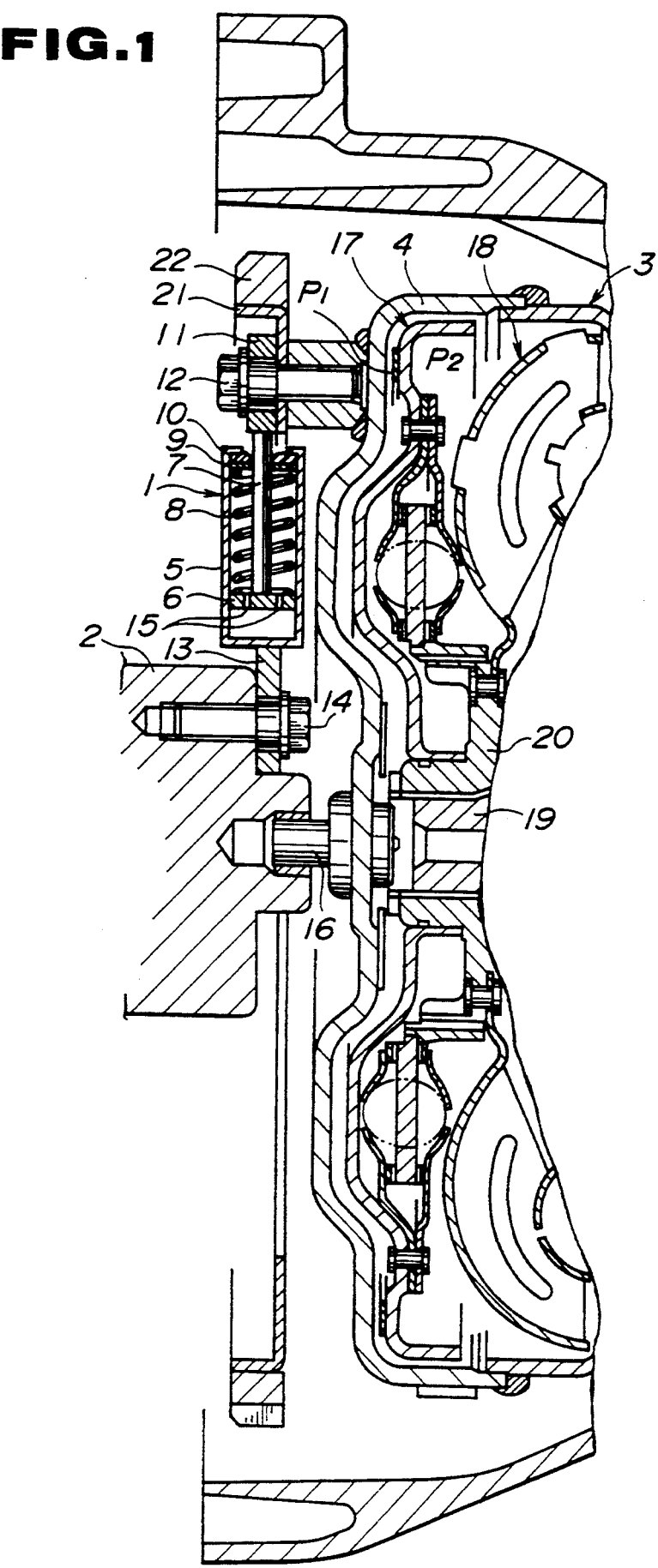
FIG. 1 is a section of the major part of the preferred embodiment of a torque transmission device for an automatic power transmission, according to the present invention.

Referring now to the drawings, particularly to FIG. 1, the preferred embodiment of a torque transmission device for an automatic power transmission is designed for transmitting an engine output torque from an engine output shaft 2, i.e. a crankshaft, to a torque converter 3. The torque transmission device includes a hydrodynamic vibration damper 1 disposed between the engine output shaft 2 and a converter cover 4 of the torque converter 3 for connecting therebetween. The hydrodynamic vibration damper 1 has a hollow cylinder 5. The hollow cylinder 5 is filled with a viscous working fluid together with a gas. The gas is contained in the hollow cylinder 5 for absorbing pressure variation in the hollow cylinder depending upon temperature. A piston 6 is disposed within the interior space of the hollow cylinder 5 to define two mutually separated fluid chambers. The piston 6 is formed with axial orifices 15 for permitting a limited flow rate of fluid flow between the mutually separated chambers in the hollow cylinder 5. The flow restriction magnitude at the axial orifices 15 may be determined according to desired vibration damping characteristics of the hydrodynamic vibration damper 1. A piston rod 7 is connected to the piston 6 for thrusting movement therewith. The piston rod 7 extends through the hollow cylinder 5. A coil spring 8 is disposed in the hollow cylinder 5. The spring 8 is seated on the piston 6 at one end and onto a spring seat 9 provided in the vicinity of the axial end of the hollow cylinder 5, through which the piston rod 7 extends, at the other end, for biasing the piston 6 together with the piston rod 7. A seal member 10 is provided between the axial end of the hollow cylinder and the spring seat 9 for establishing a fluid tight seal while permitting a thrusting motion of the piston rod 7.

The piston rod 7 of the hydrodynamic vibration damper 1 has a ring section 11 at the outer end. The ring section 11 is connected to the converter cover 4 by means of a fastening bolt 12. On the other hand, the hollow cylinder 5 of the hydrodynamic vibration damper 1 is mounted on the axial end of the engine output shaft 2 via a stay 13 which is rigidly secured on the axial end of the engine output shaft by means of a fastening bolt 14.

The converter cover 4 has a support shaft 16 which is rotatably engaged with the axial end of the engine output shaft 2. On the other hand, the converter cover 4 houses within its interior space, a lock-up clutch mechanism 17, a hydrodynamic torque converter unit 18 and so forth. As is well known, the lock-up clutch mechanism 17 is connected to a turbine hub 20 in an axially movable fashion. An apply chamber $P_1$ and a release chamber $P_2$ are defined at both sides of the lock-up clutch mechanism 17 so as to selectively establish and release a lock-up state of the lock-up cluth mechanism 17. Introduction and draining of line pressure to the apply chamber $P_1$ and the release chamber $P_2$ is controlled in per se known process depending upon vehicle driving condition. Namely, when a predetermined lock-up condition is satisfied, such as that a vehicle speed becomes higher than a predetermined lock-up criterion, the line pressure is introduced into the apply chamber to engage the lock-up clutch. By engagement of the lock-up clutch, the engine output shaft 2 is directly or mechanically connected to an input shaft 19 of a power transmission unit (not shown). On the other hand, when the predetermined lock-up condition is not satisfied, the line pressure is introduced into the release chamber to maintain the lock-up clutch at a disengaged state. In such case, the torque converter performs a converter mode operation to hydrodynamically transmit the input torque from the engine output shaft 2 to the input shaft 19 of the power transmission unit.

In addition, a drive plate 21 which carries a ring gear 22 is provided. The drive plate 21 is connected to the engine output shaft 2 via the hydrodynamic vibration damper 1. On the other hand, the ring gear 22 is meshed with a gear of a starter motor (not shown) for a cranking operation.

At initiation of an engine cranking action, tile engine output shaft 2 is driven to rotate with a drive torque input from the starter motor via the ring gear 22 and the drive plate 21. By input or the driving torque of the starter motor to the engine output shaft 2 while the torque converter 3 stays in an inoperative state, a relative angular displacement is caused between the engine output shaft 2 and the converter cover 4 of the torque converter 3. The piston 6 of the hydrodynamic vibration damper 1 is then driven outwardly together with the piston rod 7 against the spring force of the coil spring 8. By movement of the piston, the working fluid in one of the fluid chamber is compressed to generate a pressure difference between two fluid chambers. As a result, a fluid flow is created through the axial orifices 15. Since the fluid flow rate is restricted by the orifices 15, a hydrodynamic damping force which is active together with the spring force of the coil spring 8 is induced for resistance against a relative displacement between the engine output shaft 2 and the converter cover 4. Therefore, an impact at the initiation of engine cranking action can be successfully absorbed for smoothly transmitting the driving torque to the converter cover 4.

The hydrodynamic vibration damper 1 is also active for absorbing the torsional vibration induced due to fluctuation of the engine output torque. Namely, similarly to that at the engine cranking action, the torsional vibration on the engine output shaft 2 causes a relative angular displacement between the engine output shaft and the converter cover 4. Similarly to the above, the hydrodynamic vibration damper 1 then generate a damping force as a combination of the hydrodynamic force generated by the flow restriction at the orifice 15 and the spring force of the coil spring 8.

Accordingly, the engine output torque can be smoothly transmitted to the converter cover 4 via the hydrodynamic vibration damper 1. Therefore, vibration to be transmitted to the vehicular body can be satisfactorily suppressed for reducing vehicular body vibration and noise.

In the shown embodiment, a viscous fluid and a gas are filled in the hydrodynamic vibration damper 1. However, while the engine is driven, centrifugal force is active on the working fluid to force the working fluid outside. Therefore, the gas in the cylinder 5 is placed inside. Therefore, the gas cannot be left in the stroke range of the piston 6. As a result, the presence of the gas may not affect vibration damping performance of the hydrodynamic vibration damper.

Though the shown embodiment employs a specific type of hydrodynamic damper, it can be replaced with a damper unit which comprises a combination of a dashpot and a mechanical spring. Also, it is possible to employ a plurality of hydrodynamic dampers which have no installed mechanical spring. In such case, the mechanical springs are arranged in a circumferentially spaced apart relationship in an alternative fashion with the separately provided mechanical springs.

Figure 2:
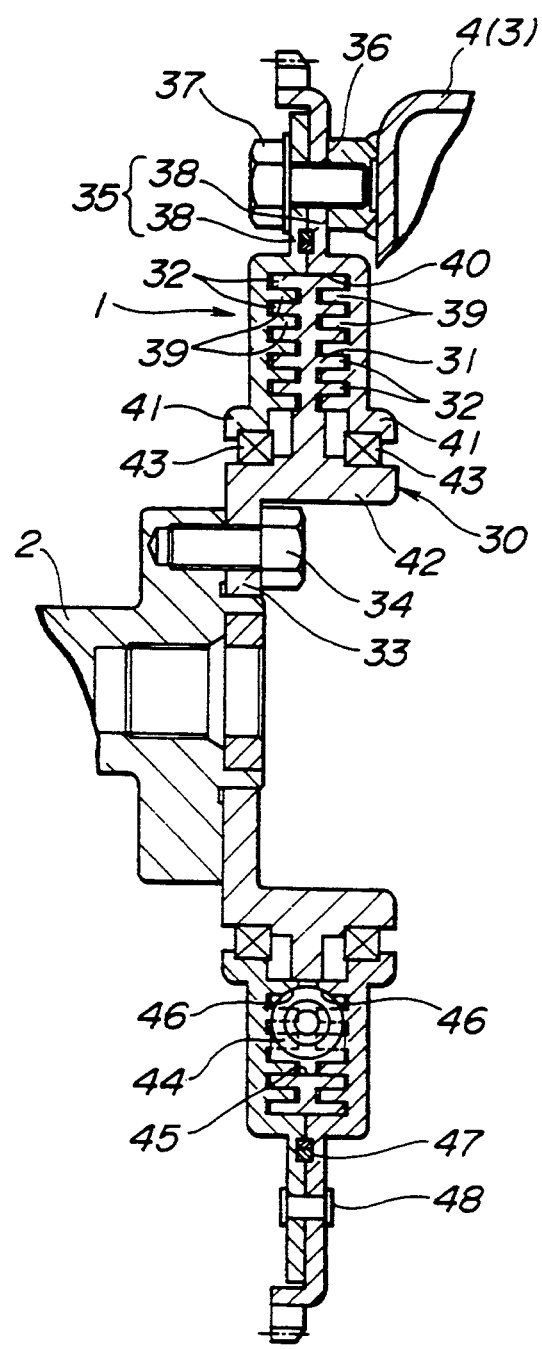
FIG. 2 is a section of front elevation of major part of another embodiment of the torque transmission device according to the invention.
Figure 3:
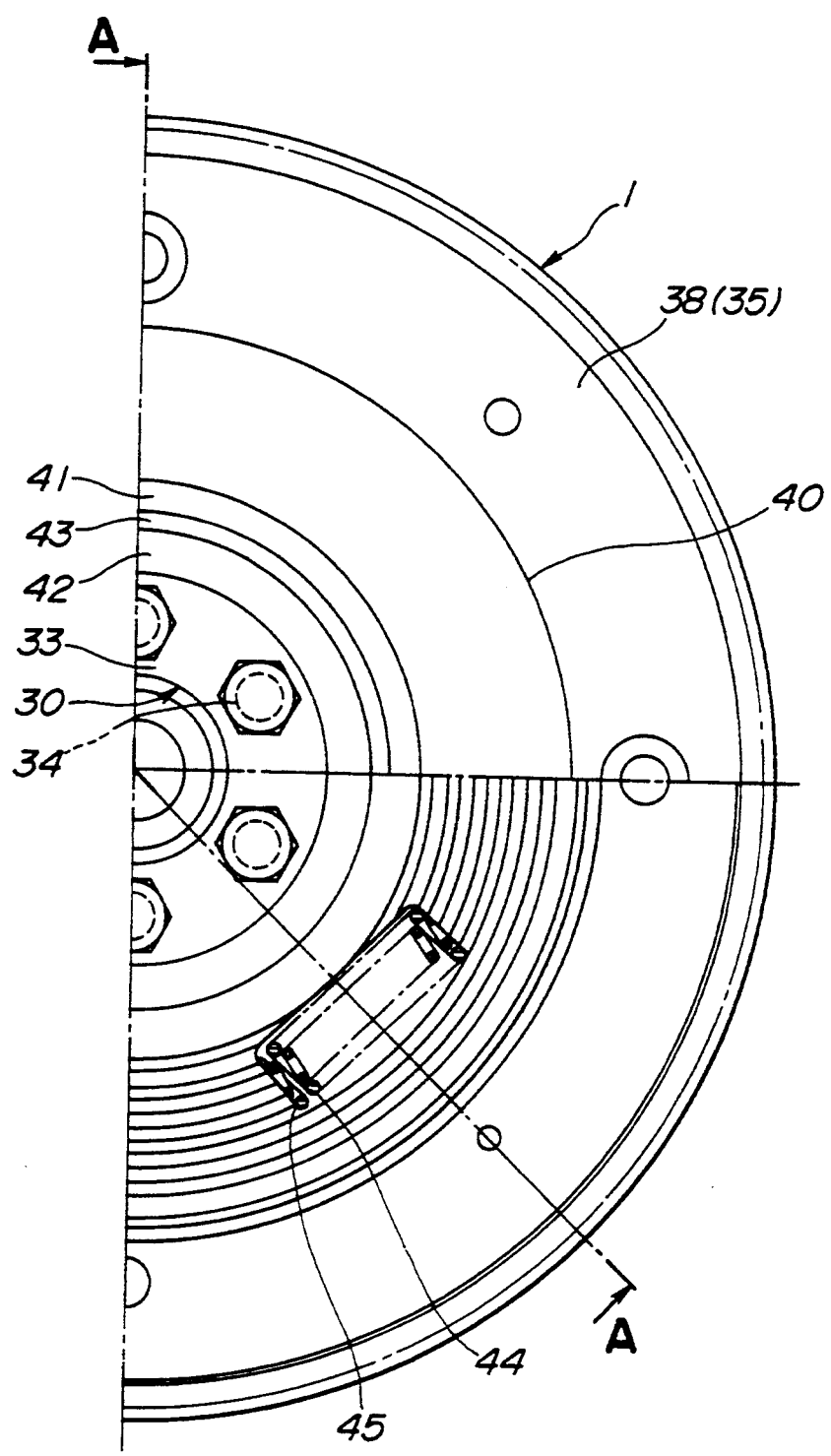
FIG. 3 is a section taken along line A—A of FIG. 2.

FIGS. 2 and 3 show another embodiment of a torque transmission device according to the invention. In this embodiment, a viscous vibration damper is employed in place of the hydrodynamic vibration damper employed in the former embodiment. The viscous vibration damper includes an input member 30 which has a radial plate section 31 formed with a plurality of concentrically arranged fins 32. On the other hand, the input member 30 has a mounting flange section 33 extending radially inwardly. The mounting flange section 33 is rigidly secured on the axial end of the engine output shaft 2 by means of fastening bolt 34. The input member 30 cooperates with an output member 35 which has a connecting section 36 extending radially outwardly. At the connecting section 36, the output member 35 is connected to the converter cover 4 by means of a fastening bolt 37. The output member 35 comprises a pair of generally disc shaped members 38 having a plurality of concentrically arranged fins 39 on their mutually opposing surfaces. The disc shaped members 38 are assembled and secured to each other by means of a rivet 48. The disc shaped members 38 as assembled define an internal space 40 to receive therein the radial plate section 31 of the input member 30 for permitting angular displacement relative to the output member 35. The fins 32 on the radial plate section 31 of the input member 30 are formed in conformance with the internal space 40 defined in the output member but are slightly smaller or thinner than respectively associated space for defining a substantially small clearance between the mating internal surfaces of the output members.

The radially inner end of the output member 35 is formed with an axially extending flange 41 which is placed in opposition to the outer periphery of a cylindrical major section 42 of the input member 30. Bearing seal rings 43 are disposed between the flange 41 and the major section 42 for establishing a fluid tight seat while permitting a relative angular displacement. A plurality of spring receptacle slots 45 are formed in the radial plate section 31 of the input member 30. Similarly, a plurality of spring receptacle recesses 46 are defined in the internal space 40. The spring receptacle slots 45 and the spring receptacle recesses 46 are cooperated with each other for defining spring chambers to receive therein mechanical coil springs 44. The spring chambers are arranged in a circumferentially spaced apart relationship to each other. The mechanical coil springs 44 exert spring forces for resisting against relative angular displacement between the input member 30 and the output member 35. Also, the viscosity of the viscous fluid, such as fluidized silicon, filled in the interior space 40 of the output member 35 serves for providing resistance against relative angular displacement between the input and output members 30 and 35.

Therefore, similarly to the former embodiment, a relative displacement between the input and output members 30 and 35 which can be caused upon initiation of an engine cranking operation, can be successfully damped for assuring a smooth torque transmission. Also, the shown embodiment of the viscous vibration damper is similarly effective for suppressing torsional vibration caused due to fluctuation of the engine output torque.

Figure 4:
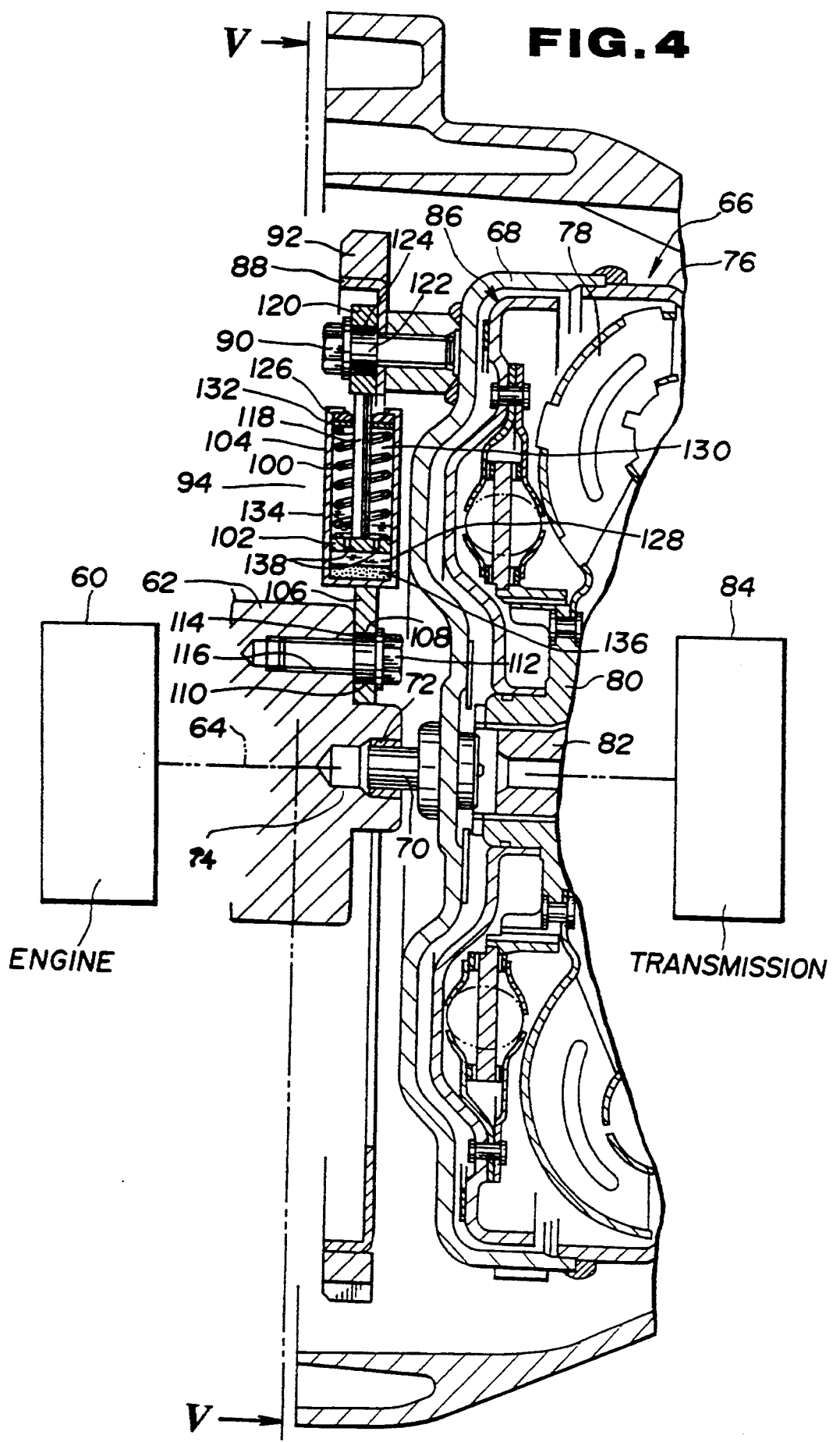
FIG. 4 is a section taken along the line IV—IV of FIG. 5, showing a further or third embodiment of a torque transmission arrangement according to the present invention.
Figure 5:
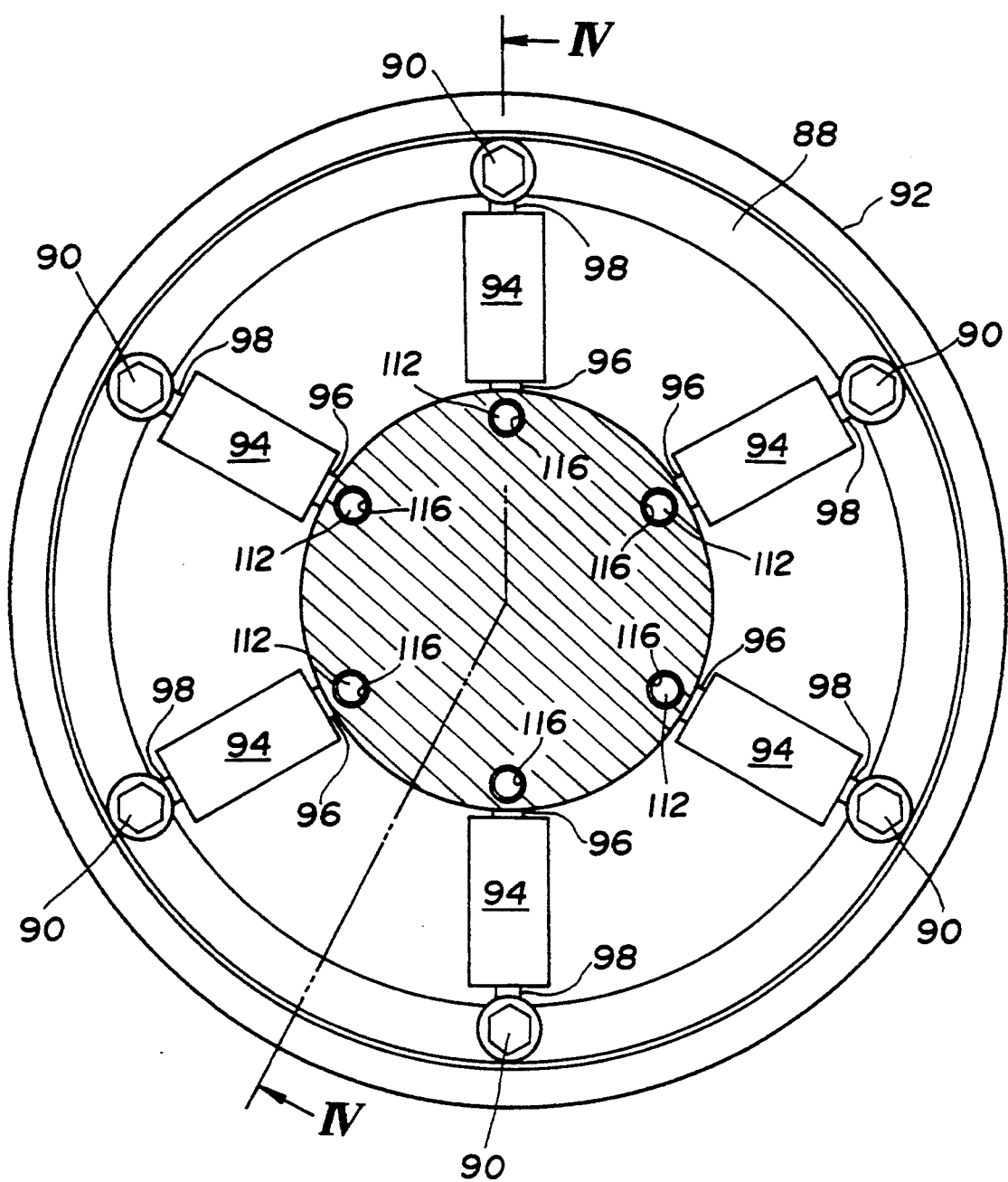
FIG. 5 is a section taken through the line V—V of FIG. 4.

Referring to FIGS. 4 and 5, a third embodiment is described.

In FIG. 4, there is shown an engine 60 having a crankshaft, as an engine output shaft 62, which is rotatable about an axis. A torque converter 66 is coaxially arranged with the engine output shaft 62 and rotatable about the axis 64. The torque converter 66 includes a converter cover 68 with a center spindle 70 rotatably received by a bearing 72 held in a center bore 74. The torque converter 66 includes a pump 76 connected to the converter cover 68 and a turbine 78 fluidly connected to the pump 76. The turbine 78 has a turbine hub 80 splined to a turbine shaft 82 which serves as an input shaft of an automatic transmission 84. In order to selectively establish a mechanical connection between the turbine 78 and the pump 76, a lock-up clutch 86 is mounted on the turbine hub 80 for unitary rotation therewith but for movement toward the adjacent wall of the converter cover 68.

A drive plate 88, which is annular as best seen in FIG. 5, is secured to the converter cover 68 by means of a plurality, six in this embodiment of outer bolts 90. The drive plate is rotatable with the converter cover 68 and carries a ring gear 92 which is adapted to mesh with an output gear of a stator motor, not shown.

In order to transmit torque to the engine output shaft 62 during a start-up operation of the engine 60 and to transmit torque from the engine output shaft 62 to the converter cover 68 during engine driving operation, a plurality, six in this embodiment, of hydraulic dampers 94 are operatively connected between the engine output shaft 62 and the drive plate 88. Each of the hydraulic dampers 94 has a radially inner end portion 96 connected to the engine output shaft 62 and a radially outer end portion 98 connected to the drive plate 88. As best seen in FIG. 5, the plurality of hydraulic dampers 94 are equi-angularly distant and extend radially, with respect to the axis 64, from the engine output shaft 62 to the drive plate 88.

Each of the hydraulic dampers 94 is extensible to allow angular displacement of the drive plate 88 relative to the engine output shaft 62. But this angular displacement is opposed by return springs, only one being shown in FIG. 4 and designated by the reference numeral 100, and a damping force created by restricted flow of hydraulic fluid displaced by extensible movement of a piston 102 relative to a cylindrical housing 104 of each of the hydraulic dampers 94.

As best seen in FIG. 4, the cylindrical housing 104 of each of the hydraulic dampers 94 has a closed axial end with an integral stay 106 formed with an eye opening 108 in which a diametrically enlarged portion 110 of the corresponding one of six inner bolts 112 is disposed. A bushing 114 is disposed between each of the diametrically enlarged portions 110 of the inner bolts 112 and the corresponding one of the stays 106 of the cylindrical housings 104 of the hydraulic dampers 94. The six bolts 112 are threadedly engaged in six equi-angularly arranged tapped holes 116 with which the engine output shaft 62 is formed (see FIG. 5).

Regarding each of the hydraulic dampers 94, the piston 102 is fixedly secured to an inner end portion of a piston rod 118. The piston rod 118 extends through an open end of the cylindrical housing 104 and has an outer end fixedly secured to an attachment ring 120. In each of the attachment rings 120 is disposed a diametrically enlarged portion 122 of the corresponding one of the outer bolts 90. A bushing 124 is disposed between each of the diametrically enlarged portions 122 of the outer bolts 90 and the corresponding one of the attachment rings 120.

Each open end of the cylindrical housing 104 is closed by an appropriate rod seal 126. The piston 102 divides a cylindrical bore of the cylindrical housing 104 into a radially inward chamber 128 and a radially outward chamber 130. The spring 100 is disposed within the radially outward chamber 130 and acts between the piston 102 and a spring retainer 132 fixed to the cylindrical housing 104 at a location adjacent the rod seal 126. A volume of hydraulic fluid 134 and a volume of inert gas 136 are disposed in the cylindrical housing 104. The hydraulic fluid fills the radially outward chamber 130, and a radially outward portion of the radially inward chamber 128, while the gas fills in the remaining radially inward portion of the radially inward chamber 128. The piston 102 is formed with a plurality of axial flow orifice passages 138. During extension movement, the piston 102 and the piston rod 118 displace the hydraulic fluid out of the radially outward chamber 130. The hydraulic fluid displaced is allowed to pass through the passages 138 into the radially inward chamber 128. The magnitude of damping force generated during the extension of the piston rod 118 is determined by the size of the passages 138. Return movement of the piston 102 to the initial position, as illustrated in FIG. 4, is effected by the force of the return spring 100.

From the preceding description regarding the third embodiment, it will readily be understood that the hydraulic dampers 94 hydraulically oppose relative angular displacement between the engine output shaft 62 and the drive plate 88 fixedly secured to the converter cover 68. Therefore, a smooth transmission of torque between the engine output shaft 62 and the converter cover 68 is made.

What is claimed is:

1. In a torque transmission arrangement:
   an engine having an engine output shaft rotatable about an axis;
   a torque converter coaxially arranged with said engine output shaft and rotatable about said axis, said torque converter including a converter cover adjacent said engine output shaft;
   an annular drive plate connected to said torque converter for unitary rotation therewith;
   hydraulic fluid means operatively disposed between said engine output shaft and said drive plate for hydraulically opposing relative angular displacement between said engine output shaft and said drive plate thereby to transmit torque therebetween,
   said hydraulic fluid means including a plurality of hydraulic dampers, each having a radially inner end portion connected to said engine output shaft and a radially outer end portion connected to said drive plate, said plurality of hydraulic dampers each extending along a line which is exclusively radial with respect to said axis, from said engine output shaft to said annular drive plate.

2. A torque transmission arrangement as set forth in claim 1, wherein said hydraulic fluid means has predetermined fixed damping characteristics.

3. In a torque transmission arrangement:
   an engine having an engine output shaft rotatable about an axis;
   a torque converter coaxially arranged with said engine output shaft and rotatable about said axis, said torque converter including a converter cover adjacent said engine output shaft;
   a drive plate connected to said torque converter for unitary rotation therewith;
   hydraulic fluid means operatively disposed between said engine output shaft and said drive plate for hydraulically opposing relative angular displacement between said engine output shaft and said drive plate thereby to transmit torque therebetween,
   said hydraulic fluid means including a plurality of hydraulic dampers, each having a radially inner end portion and a radially outer end portion, means whereby each of said radially inner end portions of said plurality of dampers is rotatably supported by said engine output shaft, and means whereby each of said radially outer end portions is rotatably supported by said drive plate, said plurality of hydraulic dampers extending along lines which are radial with respect to said axis, from said engine output shaft to said driver plate.

4. A torque transmission arrangement as set forth in claim 3, wherein said hydraulic fluid means has predetermined fixed damping characteristics.

5. A torque transmission arrangement for use with an engine having an engine output shaft rotatable about an axis, comprising:
   a torque converter coaxially arranged with said engine output shaft and rotatable about said axis, said torque converter including a converter cover adjacent said engine output shaft;
   an annular drive plate connected to said torque converter for unitary rotation therewith;
   a plurality of hydraulic dampers, each of said hydraulic dampers having a radially inner end portion directly and separately connected to said engine output shaft and a radially outer end portion directly and separately connected to said drive plate, said plurality of hydraulic dampers each having a longitudinal axis which is aligned with a line which radiates radially outward from said engine output shaft axis, so as to extend directly radially outward from said engine output shaft to said annular drive plate, said hydraulic dampers each having fixed predetermined damping characteristics which are independent of torque converter operation.

6. A torque transmission arrangement for use with an engine having an engine output shaft, comprising:
   a torque converter coaxially arranged with said engine output shaft and rotatable about said axis, said torque converter including a converter cover adjacent said engine output shaft;
   a drive plate connected to said torque converter for unitary rotation therewith;
   a plurality of radially extending fixed damping characteristic hydraulic dampers for providing a direct drive connection between said engine output shaft and said drive plate, each of said hydraulic dampers having a radially inner end portion and a radially outer end portion;
   first pivotal connection means for separately connecting each of said radially inner end portions of said plurality of dampers to said engine output shaft; and
   second pivotal connection means for separately connecting each of said radially outer end portions of said plurality of dampers to said drive plate, said first and second pivotal connection means being arranged such that the plurality of hydraulic dampers are arranged in diametrically opposed and aligned pairs.

* * * * *